United States Patent [19]

Ecker et al.

[11] 4,336,692
[45] Jun. 29, 1982

[54] DUAL SOURCE HEAT PUMP

[75] Inventors: Amir L. Ecker; Joseph A. Pietsch, both of Dallas, Tex.

[73] Assignee: Atlantic Richfield Company, Los Angeles, Calif.

[21] Appl. No.: 140,706

[22] Filed: Apr. 16, 1980

[51] Int. Cl.³ .................... F25B 27/00; F25D 21/10; G05D 23/00
[52] U.S. Cl. .......................................... 62/82; 62/156; 62/235.1; 62/238.6; 62/282; 237/2 B; 165/29; 126/435; 126/427
[58] Field of Search .................. 165/29, 17; 62/282, 62/2, 82, 238.6, 156, 235.1; 126/419, 420, 421, 427, 433, 435; 237/2 B

[56] References Cited

U.S. PATENT DOCUMENTS

| | | | |
|---|---|---|---|
| 2,081,479 | 5/1937 | Fink | 62/82 |
| 2,468,626 | 4/1949 | Graham | 165/29 |
| 3,681,933 | 8/1972 | Check, Jr. | 62/156 |
| 3,922,876 | 12/1975 | Wetherington, Jr. et al. | 62/238.6 |
| 4,098,092 | 7/1978 | Singh | 62/238.6 |
| 4,172,493 | 10/1979 | Jacobs | 62/82 |
| 4,187,687 | 2/1980 | Savage | 62/2 |
| 4,256,475 | 3/1981 | Schafer | 62/2 |

Primary Examiner—Albert J. Makay
Assistant Examiner—Harry Tanner
Attorney, Agent, or Firm—James C. Fails

[57] ABSTRACT

What is disclosed is a heat pump apparatus for conditioning a fluid characterized by a fluid handler and path for circulating the fluid in heat exchange relationship with a refrigerant fluid; at least two refrigerant heat exchangers, one for effecting heat exchange with the fluid and a second for effecting heat exchange between refrigerant and a heat exchange fluid and the ambient air; a compressor for efficiently compressing the refrigerant; at least one throttling valve for throttling liquid refrigerant; a refrigerant circuit; refrigerant; a source of heat exchange fluid; heat exchange fluid circulating device and heat exchange fluid circuit for circulating the heat exchange fluid in heat exchange relationship with the refrigerant; and valves or switches for selecting the heat exchangers and direction of flow of the refrigerant therethrough for selecting a particular mode of operation. The heat exchange fluid provides energy for defrosting the second heat exchanger when operating in the air source mode and also provides an alternate source of heat.

2 Claims, 2 Drawing Figures

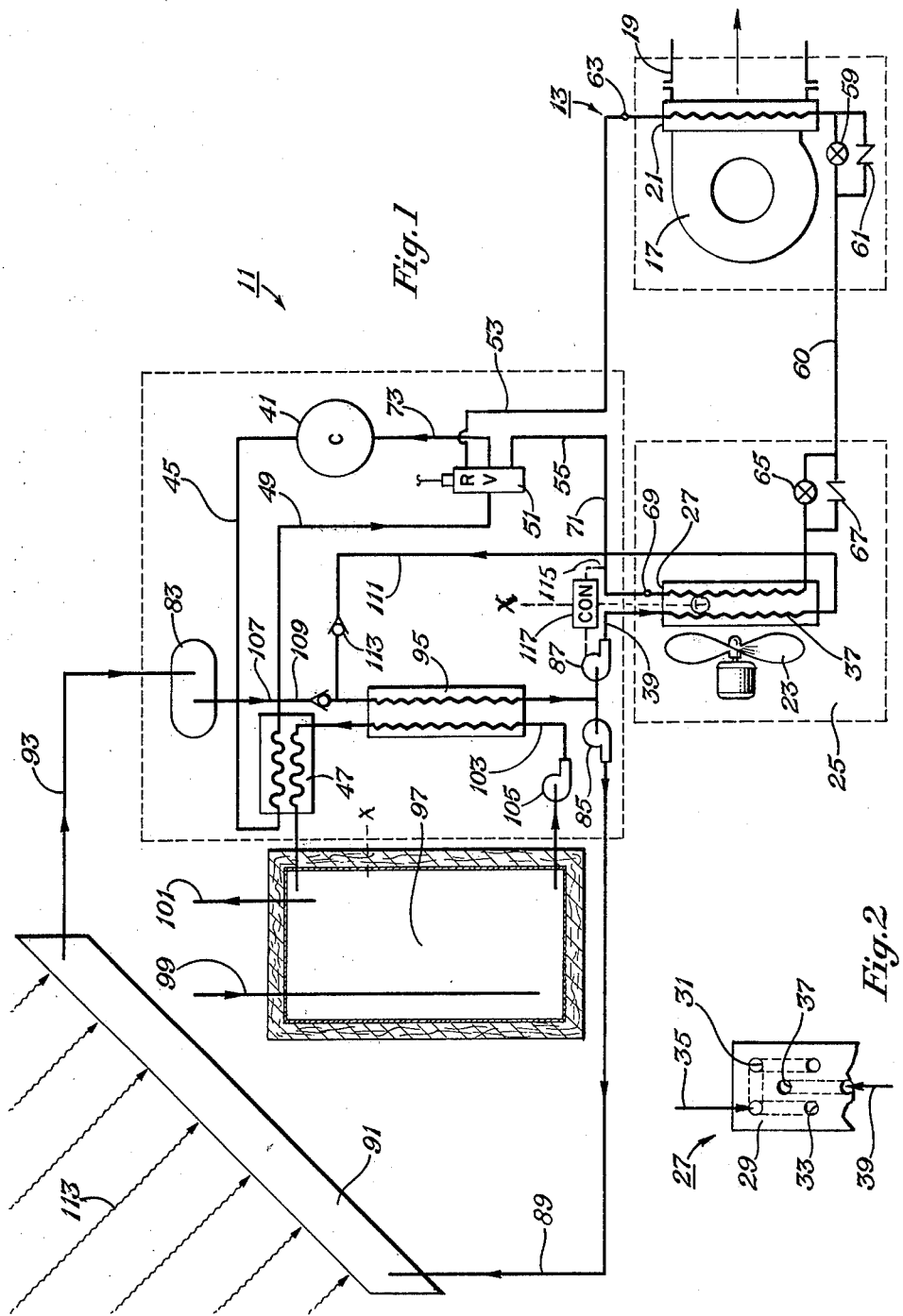

DUAL SOURCE HEAT PUMP

FIELD OF THE INVENTION

This invention relates to apparatus for conditioning a fluid; such as air used in cooling or heating an enclosed space in which the air is circulated in heat exchange relationship with a refrigerant fluid. More particularly, this invention relates to a heat pump apparatus for conditioning an enclosed space and employing a solar heated fluid to provide defrosting of the evaporator when operating in the heating mode. This same fluid can also be used as a secondary heat source.

DESCRIPTION OF THE PRIOR ART

The prior art is replete with a wide variety of types of apparatuses for heating and cooling an enclosed space, such as buildings or the like. Heat pumps have been used to pump heat from one location to another at Coefficients of Performance greater than one, or more economically than heat could be generated if the enclosed space were to be heated by electrical resistance heaters. As is recognized in heat pump systems, heat is absorbed by a refrigerant by vaporizing a liquid; for example, in an outdoor heat exchanger in heat exchange with ambient air. This then allows the refrigerant to be taken into a compressor as a gas. The compressor compresses the gas to high pressure, high temperature gas that is then heat exchanged with the air circulated in the building and the gas is condensed to a liquid, releasing heat in the process. The liquid is then flashed to a lower pressure through an expansion means into the outdoor heat exchanger where it is vaporized to a gas to repeat the cycle. One of the severe reliability and performance problems in the prior art has been the frost-up of the outdoor heat exchanger when operated as an evaporator. The term "frost-up" is employed herein as inclusive of continued condensing and freezing of moisture on the exterior surfaces to restrict or block flow of air over the outdoor heat exchanger. Specifically, the temperature of the boiling refrigerant brings the temperature of the heat exchanger coils below the dew point of the ambient air so that the moisture condenses on the coils. Furthermore, a decrease in the evaporator temperature below the freezing point then freezes the condensed moisture, forming frost, or ice. The frost builds up and could eventually completely block the flow of air through the heat exchanger. In most conventional heat pumps, to melt the frost from the coils of the outdoor heat exchanger, the unit is switched to the cooling mode and the outdoor coil assumes the function of a condenser with the resultant thermal penalty of imposing cooling on the building that already is in need of heat.

Many systems have been tried to employ some supplemental heat source for defrosting the frost-laden outdoor heat exchanger. Typical of these prior art systems are those described in the following U.S. Patents. U.S. Pat. No. 2,188,811 discloses an air conditioning plant in which the indoor air was circulated over the evaporator to melt the frost. U.S. Pat. No. 2,584,573 disclosed a method for storing heat in the ground beneath the house in a labyrinth of pipes through which the hot refrigerant liquid was caused to pass. U.S. Pat. No. 2,689,090 disclosed a heating system employing a heat exchanger disposed in the soil outside the space to be air conditioned and means for extracting that heat and taking it into the space. U.S. Pat. No. 2,693,939 disclosed a heating and cooling system with a sensing element to detect the rate of the heat intake into the heat receiver, as for solar radiation, and a second sensing element operative in response to the evaporator exit temperature to control the flow of refrigerant. U.S. Pat. No. 2,829,504 uses ambient air to defrost. U.S. Pat. No. 2,847,190 discloses an air conditioning apparatus having automatic defrost with auxiliary heaters at the evaporator coil. U.S. Pat. No. 2,970,816 also shows the use of auxiliary heaters at the evaporator coil to melt the frost. U.S. Pat. No. 3,189,085 shows air conditioning apparatus that uses air heated and circulated over the evaporator to defrost the evaporator, the heater being an electric resistance heater. U.S. Pat. No. 4,030,312 shows the use of solar heat for melting the frost on the evaporator. U.S. Pat. No. 4,049,407 discloses a heating system for building structure in which heat from solar collectors and from warm air is stored in the earth which surrounds the heat pump system. U.S. Pat. No. 4,062,489 discloses a solar-geothermal heat system. U.S. Pat. No. 4,065,938 discloses air conditioning apparatus with a booster heat exchanger. U.S. Pat. No. 4,112,920 discloses a solar heater including a rotatable tank with means for absorbing heat from the sun. U.S. Pat. No. 4,165,037 shows apparatus and method for combined solar and heat pump heating and cooling with means for combining refrigerant flow from second and third heat exchanger coils before entering the suction side of the compressor. U.S. Pat. No. 4,165,036 discloses an elaborate multi-source heat pump air conditioning system including a convertible heat exchange means alternately operable for collection of solar heat in the first heat exchange liquid and for radiation of internal heat from a second heat exchange liquid with the media having high and low thermal masses and valve means for selective closed loop circulation through the convertible heat exchange means.

From the foregoing it can be seen that these prior art systems have required elaborate interconnection between heat sources and storage areas, supplemental heat exchangers, heaters and the like. Specifically, the prior art systems have not provided a simple heat pump system that provides supplemental energy, such as solar energy, for defrosting the outdoor coil and as a secondary heat source; yet is economical enough to provide an improved new system that does not require elaborate defrosting means.

SUMMARY OF THE INVENTION

Accordingly, it is an object of this invention to provide a heat pump system that does not require elaborate defrosting means; but is simple and economical enough that it can provide an improved new system.

It is a specific object of this invention to provide a simple heat pump system that is operable in a heating mode providing defrosting of the evaporator, without requiring supplemental heaters, supplemental heat exchangers, supplemental heat storage areas.

It is also a specific object of this invention to provide a heat pump system in which a supplementary heated fluid; for example, a solar heated fluid; melts off any frost that may form. This same fluid is also used as a secondary heat source for heating.

In accordance with this invention, there is provided an apparatus for conditioning of fluid comprising:

a. a fluid handler and fluid path means for circulating the fluid in a path in heat exchange relationship with a refrigerant fluid;

b. at least two refrigerant heat exchangers, the first of the heat exchangers being disposed in the path of the fluid so that the fluid is flowed therepast in heat exchange relationship therewith and the second of the heat exchangers being disposed in a heat exchange fluid circuit for circulating the refrigerant in heat exchange relationship with the heat exchange fluid and disposed in the path of ambient air for circulating the refrigerant in heat exchange relationship with the ambient air;

c. at least one compressor connected into the refrigerant circuit for efficiently compressing the refrigerant from its inlet pressure to its discharge pressure under conditions of operation of the refrigerant circuit;

d. at least one metering valve connected at the inlet of a heat exchanger in which the liquid refrigerant is being vaporized;

e. a refrigerant circuit serially connecting the heat exchangers, metering valve and compressor and defining a flow path for the refrigerant;

f. means for selecting the heat exchangers and direction of flow of refrigerant therethrough for selecting a particular mode of operation of the heat pump;

g. refrigerant disposed in the refrigerant circuit and adapted to be circulated in a selected flow path for transferring heat at a coefficient of performance greater than one;

h. a source of heat exchange fluid;

i. heat exchange fluid circulating means for circulating the heat exchange fluid in a heat exchange circuit and in heat exchange relationship with the refrigerant;

j. a heat exchange circuit serially connecting the heat exchange fluid source, circulating means and the second heat exchanger; whereby the heat exchange fluid can be circulated through the second heat exchanger.

In one aspect of this invention, the heat exchange fluid is circulated to melt any frost that may have formed on the outdoor heat exchanger.

In a second aspect of this invention, the heat exchange fluid is circulated to the second heat exchanger so as to provide a secondary source of heat to the evaporator when in the heating mode.

BRIEF DESCRIPTION OF DRAWINGS

FIG. 1 is a schematic illustration of an apparatus in accordance with one embodiment of this invention.

FIG. 2 is a partial cross sectional view, partly schematic, of an outdoor heat exchanger in accordance with the embodiment of FIG. 1.

DESCRIPTION OF THE PREFERRED EMBODIMENTS

It is to be realized that this invention may be employed in any environment in which it is desired to condition a fluid temperature-wise. It has particular usefulness where the fluid is to be heated and where, except for this invention, the evaporator would require complex and undesirable approaches to remove frost formation. It is in the area of space heating in which air is circulated within an enclosed space, such as a building or the like, that this invention has widest usefulness at the present. Accordingly, it is in this environment that the embodiment of this invention will be described.

Referring to FIG. 1 for a clear understanding of the invention, the apparatus 11 includes an air handler and air path means 13 that comprises an air blower 17 that is connected with a plenum 19. The air blower 17 may comprise any of the conventional air handlers such as the so called "squirrel cage" blowers that are powered directly or by suitable intermediate links with an electric motor or the like. These blowers and motors are designed for circulating the requisite quantity of air throughout the enclosed space to be conditioned; for example, a building or the like.

The plenum 19 may comprise any of the prior art types of plenums. As illustrated, it is a sheet metal or fiber glass major duct with tributary ducts branching off it (the latter not being illustrated). The return to the suction side of the air blower 17 may be by separate ducts or by way of the building structure and suitable louvered inlets to the suction side of the air blower 17. With this technique the air is able to be passed in heat exchange relationship with a refrigerant fluid.

A first refrigerant-fluid (conditioned air) heat exchanger 21 is disposed on the discharge side of the air blower 17 so that the air is passed in heat exchange relationship with the refrigerant fluid that is passed interiorly through the coils of the first exchanger 21. The first heat exchanger 21 serves as an evaporator when the heat pump is being operated in the cooling mode and serves as a condenser when the heat pump is being operated in the heating mode. While the construction of the first heat exchanger 21 may take any of the suitable forms, it is preferable to employ conventional finned tube heat exchanger for highly efficient heat transfer regardless of whether the air is being heated or cooled.

Apparatus 25 includes a second heat exchanger 27. The second heat exchanger 27 is emplaced in a separate compartment, located exteriorly of the enclosure, or building. The second heat exchanger 27 is connected in series with the first heat exchanger 21 in the refrigerant circuit. The second heat exchanger 27 is employed to reject heat to the outdoor ambient air when the system is operated in the cooling mode. Alternatively, it is employed to absorb heat from the outdoor ambient air when the apparatus is operated in the heating mode. A fan 23 is provided and powered by suitable electric motor or the like to circulate the outdoor ambient air in heat exchange relationship with the refrigerant in the second heat exchanger 27. The second heat exchanger 27, as can be seen in FIG. 2, preferably comprises finned tubes or the like to afford highly efficient heat transfer. Any of the other heat exchanger forms can be employed. Specifically, the heat exchanger 27 is formed of fins 29 and respective rows of tubing. As illustrated, the tubings 31, 33 comprise passageways for refrigerant; for example, as fed by way of lines like line 35. A second set of tubes 37 are for circulation of a heat exchange fluid; for example, as fed by way of lines like line 39. The respective refrigerant and heat exchange fluids may be flowed in heat exchange relationship through the second heat exchanger 27 in any of the conventional manners. For example, there may be concurrent flow, countercurrent flow, or combination thereof. Of course, it is to be realized that there must be a complete circuit with incoming lines and effluent lines in order to flow the respective refrigerant and heat exchange fluids through the heat exchanger 27. Moreover, while only respective combinations of one and two sets of coils are shown, there may be a plurality of sets employed for each of the respective refrigerant and heat exchange fluid.

To provide motive force for flowing the refrigerant through the coils in the heat exchangers, a compressor 41 is employed. The compressor 41 is shown with a capital C in FIG. 1 and may take the form of any of the conventional compressors.

The discharge side of the compressor 41 is connected by tubing 45 with a desuperheater 47. The desuperheater 47 may be omitted if desired; but it improves the economics in that it reduces the cost of heating water for domestic hot water or the like. Basically, the desuperheater is a heat exchanger in which the hot refrigerant discharge gas from the compressor is passed interiorly of the coils on one side and the water to be heated is passed on the other side.

The discharge side of the desuperheater is connected via line 49 with a reversing valve 51.

The reversing valve 51 is a solenoid operated valve in which a plunger directs the refrigerant to one of two paths depending upon whether it is in the cooling or heating mode. A typical reversing valve is illustrated and described in a co-pending application Ser. No. 125,503 filed Feb. 28, 1980, entitled "Multiple Source Heat Pump", Amir L. Ecker, assigned to the assignee of this application; and the descriptive matter of that patent application is incorporated herein by reference for details that are omitted herefrom. Specifically, in the heating mode, the reversing valve is positioned so that the refrigerant, in the form of a hot compressed gas, flows into valve is positioned so that the hot compressed refrigerant flows into the line 53.

The line 53 is connected with the inlet side of the first refrigerant-air heat exchanger 21. This defines a refrigerant flow path for the hot compressed refrigerant gas that allows efficient transfer of heat from the hot compressed refrigerant into the air being circulated into the space to be heated.

As indicated hereinbefore, a metering valve is connected at each of the inlet sides of the heat exchangers 21 and 27. For example, when the first refrigerant-air heat exchanger 21 is being employed as an evaporator in the cooling mode there is provided a metering valve 59 that is connected in parallel with a check valve 61. The check valve blocks the flow from the line 60 allowing metering valve 59 to control flow into the heat exchanger 21 to keep it operating efficiently as an evaporator. Using a thermoelectric expansion valve, refrigerant metering is controlled with a thermistor bulb 63, located at the exit of the heat exchanger 21.

Conversely, a metering valve 65 is connected in parallel with a check valve 67 at the inlet to the second heat exchanger 27. The check valve 67 blocks flow of fluid from the line 60, allowing the metering valve 65 to control liquid refrigerant into the heat exchanger 27 when it is being operated as an evaporator, as in the heating mode. In this case, electric metering valve 65 is controlled by a thermistor bulb 69 located in the heat exchanger discharge line 71.

The side of the second refrigerant-ambient air-heat exchange fluid heat exchanger 27 is connected as via lines 71 and 55 with the reversing valve 51. The other port of the reversing valve 51 is then connected via line 73 with the suction side of the compressor 41.

The heat exchange fluid side of the second refrigerant-heat exchange fluid heat exchanger 27 is connected into a heat exchange fluid circuit that includes an expansion tank 83; conduit circuit and heat exchange fluid circulation means; for example, in the form of pumps 85, 87. For heating there is also provided inlet conduit 89, solar collector 91, and outlet line 93. As illustrated, a hot water heat exchanger 95 is included in the circuit in order to heat hot water in a hot water storage tank 97. This heat exchanger 95 is in addition to the desuperheater 47. Also provided is a water inlet line 99 and a hot water outlet line 101. A water heating circulating circuit is provided through the respective serially connected heat exchangers 95 and 47 via conduit 103 and circulating pump 105.

Connected into line 107 connected with the inlet side of the heat exchanger 95 is a check valve 109 that allows the flow to move as indicated by the arrows but prevents back flow. Also incorporated into the line 111 is a check valve 113 to allow the heating fluid to be circulated via pump 87 through the serially connected coils 39 of the heat exchanger 27 and line 111. The check valve 113 blocks the flow in the reverse direction, however.

As will be appreciated, this circuit arrangement allows use of heat stored in the hot water storage tank 97 when no sun's energy is being received. Specifically, pump 87 is turned on to circulate the heat exchange fluid through its coil 37 in the heat exchanger 27. Heat is replenished to the circulating fluid by circulating the hot water through the heat exchanger 95 by the pump 105.

Ordinarily, it is preferable to employ a heat exchange liquid that is formed of water including an anti freeze additive like ethylene glycol, diethylene glycol, triethylene glycol or propylene glycol. The heat exchanger 95 maintains isolation from the water that is in the hot water storage tank 97 which can be used for normal hot water uses in the home or the like.

The heating source that is illustrated is one or more solar collectors 91 employed to receive the sun's rays, shown by arrows 113 to heat the heat exchange fluid. The heat exchange fluid is circulated through the solar collector 91. Thus the solar collector adds heat to the water being circulated, transferring this heat to hot water storage tank 97 through heat exchanger 95.

While solar collectors are shown as the source of heating a fluid above ambient temperatures for the heating mode, any of the other available sources of heat that may be available can be alternately employed. Such other sources of heat may be at such a low potential that they are frequently neglected as being infeasible for usual purposes. For example, stack gases can be employed to heat the heated fluid; geothermal fluids can be employed if they are available; and low pressure waste steam can be employed to supply heat.

The refrigerant may comprise any of the commerically available materials suitable for normal operation conditions. Ordinarily the refrigerants that are employed in the modern commercial community are polyhalogenated hydrocarbons. Typical of the refrigerants are R-12, dichlorodifluoromethane; R-22, monochorodifluoromethane; or R-502. Other refrigerants are readily available to serve as required in any particluar locale.

One of the options that is available is to run the fan 23 to move the ambient air across the refrigerant in the heat exchanger 27 when the ambient air can provide enough heat capacity to be useful; or to not operate the fan 23 when the ambient air is too cold and the primary heat source then becomes heat exchange fluid being circulated by the pump 87.

A wide variety of controls can be employed to effect operation of the apparatus of FIG. 1. These controls range from simple, manually operable switches to more elaborate, automated controls. As illustrated a controller 117 is employed to turn on pump 87 to circulate the heat exchange fluid. The controller 117 is connected responsively to a thermostat (not shown) inside the building so as to sense when heating is indicated. The controller 117 is also connected with a temperature sensor in the storage tank 97 (the discontinuous connection being shown by "x"). When the temperature of the water is above some arbitrary temperature; for example, 120° F.–130° F.; the heat exchange fluid is circulated through the outdoor heat exchanger 27 as the source of heat for vaporizing the liquid refrigerant. Ordinarily, the fan 23 is not energized simultaneously with the pump 87. If the temperature of the water decreases to the arbitrary temperature or lower, the heat exchange fluid is not circulated as the source of heat, although it may be circulated to defrost the evaporator 27 which now operates with an air source.

To defrost, any of the conventional ways may be employed to sense that frost has formed. For example, air pressure drop can be monitored to sense frost and effect defrosting. As illustrated the controller 117 includes a timer to initiate a defrost cycle after a predetermined time of operation. The controller 117 is connected with a temperature sensor 115 to stop the defrost cycle when the temperature increases to a "stop" temperature, such as 37° F., that is above 32° F.

In operation, the compressor 41 compresses the hot refrigerant gas which is sent by way of line 45 through the desuperheater 47 to the reversing valve 51. In the heating mode, the reversing valve is placed to send the hot gases on through line 53 to the heat exchanger 21. There heat is given up to the air being circulated by the blower 17. Simultaneously the refrigerant is condensed to a liquid. The liquid is sent via check valve 61 and line 60 to metering valve 65. The metering valve 65 throttles the liquid to control the liquid level in the heat exchanger 27 responsive to thermistor 69. Heat may be supplied either by ambient air being circulated by fan 23 or by the heat exchange fluid being circulated by pump 87. The liquid refrigerant is vaporized and passes as a gas via lines 71 and 55 to reversing valve 51. At the reversing valve 51 the gaseous refrigerant is sent to the suction side of the compressor 41 via line 73. In normal operation ambient air is blown past the refrigerant vaporizing the refrigerant.

Once the need for defrosting is signalled, the fan 23 is stopped and the aqueous solution serving as heat exchange fluid is then circulated through the intermediate coils 37 of the heat exchanger, warming up the heat exchanger and the coils 31, 33 containing the refrigerant. As indicated implicitly hereinbefore, the pump 87 may circulate in a closed loop through the heat exchanger 95, exchanging heat with the water from the storage tank 97 if it is at night or the solar collector 91 is not collecting enough heat. On the other hand, the solar collector 91 may collect more heat than is necessary such that the excess heat is removed in the heat exchanger 95 by the water being circulated by the pump 105 to keep hot water in the storage tank 97. The tank 83 serves as an expansion tank to allow for expansion of the liquid and for ridding the liquid of noncondensibles.

Another advantage of this invention is that it can be employed to melt frost that may form under certain temperature and humidity conditions when operating in the air source mode. To defrost, the pump 87 circulates the heat exchange fluid through the heat exchanger coil 37. The heat that is in the heat exchange fluid, or aqueous solution, then melts the frost on the heat exchanger by raising the temperature of the coil above the freezing point of water. In the illustrated embodiment the required heat is supplied directly from the solar collectors 91 or from the storage tank 97 via heat exchanger 95. As will be apparent, of course, supplemental source such as waste heat streams from condensing steam, geothermal water, or even water from an underground spring, river, lake or the like that has the needed heat can be employed.

From the foregoing, it can be seen that this invention accomplished the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

We claim:

1. Apparatus for conditioning a fluid temperature-wise and affording a single temperature hot water storage system for domestic using, defrosting, and supplying heat to a heat pump, comprising:
   a. a hot water storage tank connected to conventional hot water inlet and outlet lines;
   b. a fluid handler and fluid path means for circulating said fluid in a path in heat exchange relationship with a refrigerant fluid;
   c. at least two refrigerant heat exchangers; a first of the heat exchangers being disposed in the path of the fluid such that the fluid is passed in heat exchange relationship therewith, and a second of the refrigerant heat exchangers being disposed in a heat exchange fluid circuit for circulating the refrigerant in heat exchange relationship with a heat exchange fluid and in heat exchange relationship with ambient air;
   d. at least one compressor connected into a refrigerant circuit for efficiently compressing the refrigerant from its inlet pressure to its discharge pressure under conditions of operation of the refrigerant circuit;
   e. at least one metering valve connected at the inlet of a heat exchanger in which liquid refrigerant is being vaporized;
   f. a refrigerant circuit serially connecting said heat exchangers, metering valve and compressor and defining a flow path for said refrigerant;
   g. a reversing valve included in said refrigerant circuit for effecting operation respectively in a heating mode and in a cooling mode;
   h. means for selecting the heat exchangers and direction of flow of refrigerant therethrough for selecting a particular mode of operation of the heat pump;
   i. refrigerant disposed in said refrigerant circuit and adapted to be circulated in a selected flow path for transferring heat at a coefficient of performance greater than one;
   j. a source of heat in the form of a heat exchange fluid;
   k. heat exchange fluid circulating means for circulating said heat exchange fluid in a heat exchange circuit and in heat exchange relationship with said refrigerant;
   l. a heat exchange circuit serially connecting said heat exchange fluid source, circulating means and second refrigerant-heat exchange fluid heat exchanger; whereby said heat exchange fluid can be circulated through said second heat exchanger to provide optionally melting of accumulated frost and a secondary source of heat;

m. temperature sensor disposed in said second heat exchanger to measure the temperature therewithin;

n. control means to energize said heat exchange fluid circulating means when the temperature measured in said second heat exchanger is less than 32° F. and to keep said heat exchanger fluid circulating means operative until the ice is melted from said second heat exchanger and the temperature in said second heat exchanger is above the freezing point of water whereby accumulated frost is detected and melted; said second heat exchanger having an ambient air circulation means for circulating ambient air past said second heat exchanger; and said control means including means for deenergizing said ambient air circulation means during defrosting;

o. solar heating circuit connected with said heat exchange circuit;

p. solar fluid circulating means disposed in said solar heating circuit for circulating said heat exchange fluid therethrough; said hot water storage tank having a hot water fluid circulating means serially connected in a hot water circulating circuit that also incorporates a desuperheater heat exchanger and a water-heat exchange fluid heat exchanger for heat exchanging respectively with hot refrigerant and heat exchange fluid; said desuperheater also being serially incorporated in said refrigerant circuit downstream of said compressor; said water-heat exchange fluid heat exchanger also being serially incorporated in said solar heating circuit with said solar fluid circulating means for heat exchange between said heat exchange fluid and said hot water; whereby a single temperature hot water storage serves optionally as a heat sink and a heat source to allow storing heat during periods of sun and using heat optionally for defrosting and for increasing efficiency of the heat pump.

2. A method of operating a heat pump, having a conventional compressor and refrigerant circuit, in a heating mode and simultaneously supplying a single temperature hot water storage system for domestic using, defrosting and supplying heat for the heat pump, comprising the steps of:

a. heat exchanging a heated, compressed refrigerant gas with a fluid being circulated by a fluid handler to heat the fluid and condense the refregerant gas to form a refrigerant liquid;

b. heat exchanging the refrigerant liquid in an outdoor heat exchanger with optionally ambient air;

c. providing separate heat exchange flow path in said outdoor heat exchanger for a heat exchange fluid;

d. providing a single temperature hot water storage capability, adding heat thereto with heat exchange with the solar fluid when the temperature of the solar fluid is greater than the temperature of the hot water, also adding heat to the hot water by exchanging heat with the hot compressed refrigerant gas in a desuperheater;

e. measuring the temperature in said outdoor heat exchanger;

f. employing said hot water for domestic hot water, in supplying heat to said refrigerant in said outdoor heat exchanger and in defrosting said outdoor heat exchanger when the temperature measured therein falls below 32° F. to indicate that frost has formed thereon.

* * * * *